United States Patent

[11] 3,607,374

| [72] | Inventors | Markus Seibel<br>Mainz;<br>Klaus Thoese, Wiesbaden-Schierstein, both of Germany |
|---|---|---|
| [21] | Appl. No. | 761,811 |
| [22] | Filed | Sept. 23, 1968 |
| [45] | Patented | Sept. 21, 1971 |
| [73] | Assignee | Keuffel & Esser Company<br>Morristown, N.J. |
| [32] | Priority | Sept. 25, 1967 |
| [33] | | Germany |
| [31] | | K 63-437 VI b/75 C |

[54] DRAFTING FILM MATERIALS
4 Claims, No Drawings

[52] U.S. Cl. ....................................117/138.8 F,
117/161 L, 117/161 LN, 117/161 UT, 117/161 UC, 117/161 UE
[51] Int. Cl. ............................................. B32h 27/08
[50] Field of Search............................................ 117/161
UE, 161 UC, 161 UT, 161 L, 161 LN, 138.8 F; 96/75

[56] References Cited
UNITED STATES PATENTS

| 2,807,865 | 10/1957 | Shippee et al. | 117/161 X |
| 2,999,016 | 9/1961 | Beeber et al. | 117/138.8 X |
| 3,163,535 | 12/1964 | Straw | 117/138.8 U |
| 3,201,251 | 8/1965 | Nadeau et al. | 117/138.8 X |
| 3,231,393 | 1/1966 | Downing et al. | 117/161 UX |
| 3,244,523 | 4/1966 | Growald et al. | 96/75 |
| 3,246,986 | 4/1966 | Borchers | 96/75 X |
| 3,260,599 | 7/1966 | Lokken | 96/75 |
| 3,269,994 | 8/1966 | Horn | 117/138.8 X |
| 3,437,484 | 4/1969 | Nadeau | 117/138.8 X |
| 3,498,786 | 3/1970 | Notley et al. | 96/75 X |

FOREIGN PATENTS

| 1,002,905 | 9/1965 | Great Britain | 117/138.8 |

*Primary Examiner*—William D. Martin
*Assistant Examiner*—M. R. Lusignan
*Attorneys*—J. Russell Juten, Peter F. Willig, Lionel N. White and Milford A. Juten ABSTRACT: A noncurling drafting film of good ink receptivity is prepared by coating a polyester film support with a silica pigmented composition of an acrylic ester copolymer and a polyvinyl alcohol cross-linked with an aldehyde condensate resin.

DRAFTING FILM MATERIALS

BACKGROUND OF THE INVENTION

Dimensionally stable sheets for engineering drawings have for a substantial time generally comprised a support of a polyester film bearing a pencil- and/or ink-receptive drawing layer of a pigment and a polymeric or resinous binder. Predominantly used pigments are finely divided colorless inorganic pigments, such as silica, aluminum silicate, titanium dioxide, calcined alumina, and the like. Commonly used binders for these pigments are cellulose esters, vinylidene chloride copolymers, epoxy resins, and aldehyde condensation resins, e.g. condensation resins from formaldehyde and phenols, urea or melamine. These known binders have certain disadvantages for the preparation and characteristics of the drawing layer.

Most of the known binders are water-insoluble. The thus necessary application of the layer from organic solvents has technological disadvantages. Using them requires means for storing and recovery and, if required, also means against explosion hazard.

The above-mentioned condensation resins are partly water-soluble and thus also can be applied from aqueous solutions. But since the finished drawing layer has to be resistant to aqueous inks, the resins have to be hardened after application. Hardening the entire quantity of binder requires relatively high temperatures and long hardening times. This often entails considerable embrittlement of the drawing layer.

Another undesirable property of the known drawing materials which becomes particularly apparent after a relatively long hardening time of the binder at high temperatures is their tendency to curl, which results from different stresses in the support and in the layer.

For compensating this tendency of curling, the back side of the support is usually provided with a coating qualitatively similar to the drawing layer. This process complicates the coating operation and is not completely safe against the later occurrence of different stresses and the curling of the material caused thereby.

It has further been tried to avoid the curling tendency by using relatively thick base films, e.g. of a thickness above $100\mu$. This solution is not only very expensive but also has the disadvantage that the read right copies prepared with the material with writing thereon are less sharp.

A further disadvantage of the known drawing layers with hydrophobic binders or binders hardened at a high temperature is their poor wettability by aqueous inks. It has thus been suggested to additionally provide such drawing layers with a hydrophilic top coating.

SUMMARY OF THE INVENTION

The present invention provides a transparent or translucent drawing material which can be written upon with aqueous inks or inks containing organic solvents, which can be prepared of a small thickness without tending to curl, and which can be prepared in a simple manner by coating from an aqueous solution.

The material of the present invention comprises a polyester film support and a pigmented drawing layer and is characterized by a hardened mixture of polyvinyl alcohol, a precondensate from urea dna formaldehyde or melamine and formaldehyde, and an acrylic ester copolymer as the binder.

The polyvinyl alcohol used for the material of the present invention has a K-value, as determined according to Fikentscher, of at least about 50, preferably from 50 to 90, and a residual content of unsaponified acetyl groups of at most 12 percent in order to achieve a good combination of water insolubility and hydrophilic properties.

The drawing materials of the present invention are prepared by applying the constituents of the coating mixture in aqueous solution or dispersion. The dried coatings may be hardened at relatively low temperatures within a short time. The initially water-soluble polyvinyl alcohol is cross linked by the condensation resin. The addition of small quantities of acid may be employed to accelerate cross linking. The hardened materials do not exhibit a curling tendency even when used with very thin supports, e.g. of a thickness of $30\mu$ and less. The drawing layers may be written with any ink without further treatment.

The water-insoluble component of the binder is an acrylic ester copolymer which is added before application to the polyvinyl alcohol solution in the form of an aqueous dispersion. The copolymer contains, as the substantial component, units obtained by polymerization of acrylic or alkylacrylic esters. Monomers suitable therefor are, for example, methyl acrylate, ethyl acrylate, isopropyl acrylate, n-butyl acrylate, isobutyl acrylate, methyl methacrylate, methyl ethacrylate, butyl methacrylate, and the like. Suitable copolymers are aliphatic and aromatic vinyl and vinylidene compounds, e.g. styrene, $\alpha$-alkyl styrenes, vinyl toluenes, vinyl chloride, vinyl ether vinyl ester, acrylic acids, and the like. The quantity of acrylic ester units preferably should be more than 50 percent. The quantity of units imparting water solubility, e.g. acrylic acid units, must not be so high that the polymer becomes water soluble thereby to a considerable extent.

The pigment component in the coating composition comprises any of the commonly used silica, calcined alumina, aluminum silicate or mixtures of these types of pigment. In order to simultaneously achieve the desired degree of matting and pencil abrasion, it is advantageous to use mixtures of pigments of different grain size, e.g. a mixture of silica of a grain size of about 1.5 $\mu$ and of one of a grain size of about $4\mu u$. In order to 1,3-propane and uniform 1,4-butane diol, the support by the coating mixture, a wetting agent is preferably added thereto.

Supports used for the drawing materials of the present invention may be polyester films, particularly axially oriented polyester films. Suitable polyesters are most of the high molecular weight condensation products of multivalent carboxylic acids with multivalent alcohols which yield deformable crystalline or partially crystalline products. Preferably employed are polyesters from terephthalic acid and ethylene glycol, but it is also possible to use especially copolyesters of these monomers with other dicarboxylic acids, e.g. isophthalic acid, and other bivalent or multivalent alcohols, e.g. 1,3-propane diol, 1,4-butane diol, neopentyl glycol. Polyester films of this type may be pretreated according to various known methods to improve the receptivity of the drawing layers of the present invention.

The drawing films of the present invention may also be processed to give light-sensitive reproduction materials, e.g. by providing them on the back side with a light-sensitive reproduction layer. The drawing layer itself may also be sensitized by diffusion sensitization with solutions of suitable substances, e.g. with diazo-type mixtures. Such reproduction materials offer the possibility to manually complete or alter drawings copied thereon. Much otherwise necessary manual drawing work is thus avoided.

PREFERRED EMBODIMENTS

The following examples illustrate the invention. The quantities and percentages are by weight if not otherwise indicated.

Example 1

A biaxially oriented $30\mu$ thick polyethylene terephthalate film was immersed in a solution of the following precoat composition:

100 g. of trichloroacetic acid,
10 g. of polyvinyl alcohol having a K value of 70, free from acetyl groups (Mowiol N 70/98),
1.5 g. of a commercial cleansing agent the active constituents of which are anionic wetting agents (fatty alcohol sulfates and alkylaryl sulphonates) and nonionic wetting agents (alkyl benzene polyglycol ether),
890 g. of water.

The film with the precoat layer was dried for 2 minutes at 140° C. The coating compositions of the invention which are hereinafter described were then cast on the precoat layer. The aqueous dispersions were dried and the films hardened for 1 minute at 120° C. The resulting drawing layer had a thickness of about 8μ in each case.

A series of coating compositions were prepared and coated as above comprising (1) a polyvinyl alcohol of a K value of 70 and an acetyl group content of 12 percent, and including 5 percent of a partially etherified melamine/formaldehyde condensate (Cassurit MLP liquid); (2) a copolymer comprising about 66 percent methyl acrylate, 22 percent vinyl isobutyl ether, and 12 percent styrene; and (3) aluminum silicate pigment in different quantitative proportions. Drawing sheet materials of particularly good ink acceptance and adhesion were achieved with comparative quantities of the above components in the following range: polyvinyl alcohol 15 to 35 percent; pigment 15 to 35 percent; copolymer 35 to 70 percent.

Per 200 g. of the mixtures of polyvinyl alcohol, copolymer, and pigment, the coating compositions also included the following further constituents:

2 g. of citric acid,
2.7 g. of wetting agent consisting of nonionic and anion-active constituents of neutral reaction (Emulsogen I 40 of Farbwerke Hoechst, leaflet Hoechst 2618 TH/S),
675 g. of water.

The finished drawing layers could successfully be written upon with inks comprising either aqueous or organic solvent vehicles. The adhesion of the inks was good.

The drawing materials did not exhibit a curling tendency. In contradistinction thereto, a 30μ thick polyester film coated in the same manner with a pigmented cellulose ester layer was considerably curled and thus could not be practically used as a drawing material.

Example 2

A coating composition comprising:
40 g. of a polyvinyl alcohol of a K value of 70 and a residual content of acetyl groups of 12 percent,
200 g. of the aqueous 50 percent dispersion of a copolymer of butyl acrylate and styrene (Acronal S 320 D),
2 g. of the melamine/formaldehyde condensate of example 1,
30 g. of a mean grain size of 1.5μ,
30 g. of silica of a mean grain size of 4μ,
2 g. of citric acid,
2.7 g. of the wetting agent of example 1, and
693 g. of water, was coated onto a 30μ thick polyethylene terephthalate film which had been pretreated to improve coating receptivity. After drying, the film was hardened for 2 minutes at 120° C. The remaining drawing layer had a thickness of 8μ. It had the same good inking and adhesion properties as the layers of example 1. The product did not exhibit a curling tendency. A drawing film of 75μ thick polyester film provided on one side with a pigmented cellulose ester layer, however, exhibited a considerable curling tendency.

Example 3

A coating composition comprising:

40 g. of calcined alumina of a particle size of about 9μ,
20 g. of silica of a mean particle size of 4μ,
40 g. of a polyvinyl alcohol of a K value of 70 and a residual content of acetyl groups of 12 percent,
200 g. of the aqueous 50 percent dispersion of a copolymer of butyl acrylate and styrene (Acronal S 320 D),
2 g. of the melamine/formaldehyde condensate of example 1,
2 g. of citric acid,
3 g. of the wetting agent of example 1, and 693 g. of water was coated onto a 36μ thick polyethylene terephthalate film provided with the adhesive layer according to example 1. The drawing layer had the same good inking and adhesion properties as in example 1, but the degree of pencil receptivity was higher. The product did not exhibit a curling tendency.

The above examples have been presented for the purpose of illustration and should not be taken to limit the scope of the present invention. It will be apparent that the described examples are capable of many variations and modifications which are likewise to be included within the scope of the present invention as set forth in the appended claims.

What is claimed is:

1. Drafting material comprising a polyester film support and a coating thereon of the heat-dried and hardened residue of a composition comprising a finely divided solid uniformly distributed throughout an aqueous dispersion of a binder consisting essentially of:
   a. 15 to 35 parts of a substantially water-soluble polyvinyl alcohol having a K value of between about 50 and 90;
   b. about 5 percent, based on the amount of said polyvinyl alcohol, of a precondensate of formaldehyde with urea or melamine; and
   c. 35 to 70 parts of a substantially water-insoluble acrylic ester copolymer having at least about 50 percent acrylic ester units.

2. Material according to claim 1 wherein said polyvinyl alcohol has a residual content of unsaponified acetyl groups of not more than about 12 percent.

3. Material according to claim 1 wherein said finely divided solid is a pigment comprising one or more of the following substances:
   a. silica,
   b. aluminum silicate,
   c. Calcined alumina.

4. Material according to claim 1 wherein said finely divided solid consists essentially of a pigment in an amount of between about 15 and 35 percent by weight and wherein said binder consists essentially of
   a. between about 15 and 35 percent by weight of a polyvinyl alcohol of a K value of about 70 and an acetyl group content of about 12 percent;
   b. about 5 percent by weight, based on said polyvinyl alcohol, of a partially etherified melamine/formaldehyde condensate; and
   c. between about 35 and 70 percent by weight of a copolymer comprising about 66 percent methyl acrylate, 22 percent vinyl isobutyl ether, and 12 percent styrene.

PO-1050
(5/69)

UNITED STATES PATENT OFFICE
CERTIFICATE OF CORRECTION

Patent No. 3,607,374              Dated  21 September 1971

Inventor(s)  Markus Seibel, Klaus Thoese

It is certified that error appears in the above-identified patent and that said Letters Patent are hereby corrected as shown below:

Column 2, lines 29 and 30 should read:

--about $1.5\mu$ and of one of a grain size of about $4\mu$. In order to achieve good and uniform wetting of the support by the--

Column 3, line 41, should read:

--30 g. of silica of a mean grain size of $1.5\mu$--

Signed and sealed this 14th day of March 1972.

(SEAL)
Attest:

EDWARD M. FLETCHER, JR.
Attesting Officer

ROBERT GOTTSCHALK
Commissioner of Patents